(12) United States Patent
Urata et al.

(10) Patent No.: US 9,778,132 B1
(45) Date of Patent: Oct. 3, 2017

(54) METHODS AND SYSTEMS FOR FORCE SENSOR CALIBRATION

(71) Applicant: X Development LLC, Mountain View, CA (US)

(72) Inventors: Junichi Urata, Tokyo (JP); Yoshito Ito, Tokyo (JP); Masaki Hamafuji, Tokyo (JP)

(73) Assignee: X Development LLC, Mountain View, CA (US)

( * ) Notice: Subject to any disclaimer, the term of this patent is extended or adjusted under 35 U.S.C. 154(b) by 0 days.

(21) Appl. No.: 14/971,304

(22) Filed: Dec. 16, 2015

(51) Int. Cl.
*G05B 19/18* (2006.01)
*G01L 25/00* (2006.01)
*B25J 5/00* (2006.01)
*B25J 9/16* (2006.01)

(52) U.S. Cl.
CPC ............... *G01L 25/00* (2013.01); *B25J 5/00* (2013.01); *B25J 9/162* (2013.01); *B25J 9/1607* (2013.01); *B25J 9/1692* (2013.01); Y10S 901/01 (2013.01)

(58) Field of Classification Search
CPC combination set(s) only.
See application file for complete search history.

(56) References Cited

U.S. PATENT DOCUMENTS

| | | | | |
|---|---|---|---|---|
| 5,357,433 A * | 10/1994 | Takenaka | ............. | B62D 57/032 180/8.1 |
| 5,838,130 A * | 11/1998 | Ozawa | ................... | B62D 57/02 180/8.1 |
| 6,243,623 B1 * | 6/2001 | Takenaka | ............... | B62D 57/02 180/8.1 |
| 6,992,457 B2 * | 1/2006 | Furuta | .................... | B25J 13/085 318/568.12 |
| 6,999,851 B2 * | 2/2006 | Kato | ...................... | G06N 3/008 318/568.1 |

(Continued)

FOREIGN PATENT DOCUMENTS

| CN | 101950176 | 1/2011 |
|---|---|---|
| EP | 1477283 | 11/2004 |
| JP | 2006239848 | 9/2006 |

OTHER PUBLICATIONS

Vukobratovic et al., "Zero-Moment Point—Thirty Five Years of Its Life", International Journal of Humanoid Robotics, vol. 1, No. 1, (2004), pp. 157-173.

(Continued)

*Primary Examiner* — Jonathan L Sample
(74) *Attorney, Agent, or Firm* — McDonnell Boehnen Hulbert & Berghoff LLP

(57) ABSTRACT

An implementation may involve causing a foot of a robot to orient in a first position, where the foot comprises a sole configured to contact a surface, where the sole comprises a first edge and a second edge, and where in the first position: (i) the first edge contacts the surface, and (ii) a zero moment point (ZMP) is located on the first edge; receiving, from a force sensor, (i) first force data indicative of a first force and (ii) first moment data indicative of a first moment; determining a calibration of the force sensor based at least in part on the first force data, the first moment data, and a distance between the ZMP and a measurement location on the robot; and while the robot is engaged in bipedal movement, controlling the bipedal movement of the robot based at least in part on the calibration.

20 Claims, 8 Drawing Sheets

(56) References Cited

U.S. PATENT DOCUMENTS

| | | | | |
|---|---|---|---|---|
| 7,236,852 B2* | 6/2007 | Moridaira | B62D 57/032 | 318/568.1 |
| 7,386,364 B2* | 6/2008 | Mikami | B62D 57/02 | 318/443 |
| 7,606,634 B2* | 10/2009 | Takenaka | B25J 13/085 | 180/65.1 |
| 7,734,377 B2* | 6/2010 | Hasegawa | B62D 57/032 | 700/252 |
| 8,419,804 B2* | 4/2013 | Herr | A61F 2/60 | 623/24 |
| 8,805,584 B2* | 8/2014 | Yamane | B25J 9/1692 | 700/245 |
| 9,120,512 B2* | 9/2015 | Shirokura | B62D 57/032 | |
| 2004/0181312 A1* | 9/2004 | Miura | B25J 13/085 | 700/258 |
| 2004/0205417 A1* | 10/2004 | Moridaira | B62D 57/032 | 714/48 |
| 2005/0066397 A1* | 3/2005 | Hidai | B62D 57/032 | 700/245 |
| 2005/0088131 A1* | 4/2005 | Furuta | B25J 13/085 | 318/568.12 |
| 2005/0171635 A1* | 8/2005 | Furuta | B62D 57/032 | 700/245 |
| 2005/0240307 A1* | 10/2005 | Kuroki | B25J 13/085 | 700/245 |
| 2006/0173578 A1* | 8/2006 | Takenaka | B62D 57/032 | 700/245 |
| 2006/0247800 A1* | 11/2006 | Takenaka | B62D 57/032 | 700/54 |
| 2007/0013506 A1* | 1/2007 | Takenaka | B62D 57/032 | 340/500 |
| 2007/0126387 A1* | 6/2007 | Takenaka | B25J 13/085 | 318/568.2 |
| 2007/0152620 A1* | 7/2007 | Takenaka | B62D 57/032 | 318/568.13 |
| 2007/0156283 A1* | 7/2007 | Takenaka | B62D 57/032 | 700/245 |
| 2008/0065269 A1* | 3/2008 | Hasegawa | B62D 57/032 | 700/260 |
| 2008/0133055 A1* | 6/2008 | Hasegawa | B62D 57/032 | 700/252 |
| 2008/0133057 A1* | 6/2008 | Hasegawa | B62D 57/032 | 700/258 |
| 2008/0208391 A1* | 8/2008 | Hasegawa | B62D 57/032 | 700/245 |
| 2009/0171503 A1* | 7/2009 | Takenaka | B62D 57/032 | 700/250 |
| 2009/0312867 A1* | 12/2009 | Hasegawa | B62D 57/032 | 700/245 |
| 2010/0126785 A1* | 5/2010 | Shimada | B62D 57/032 | 180/8.1 |
| 2011/0098856 A1* | 4/2011 | Yoshiike | B62D 57/032 | 700/246 |
| 2011/0098857 A1* | 4/2011 | Yoshiike | B62D 57/032 | 700/246 |
| 2011/0098860 A1* | 4/2011 | Yoshiike | B62D 57/032 | 700/260 |
| 2011/0160906 A1* | 6/2011 | Orita | B62D 57/032 | 700/260 |
| 2011/0160907 A1* | 6/2011 | Orita | B25J 9/1607 | 700/260 |
| 2011/0178636 A1* | 7/2011 | Kwon | B62D 57/032 | 700/253 |
| 2011/0301756 A1* | 12/2011 | Yoshiike | B62D 57/032 | 700/253 |
| 2012/0143376 A1* | 6/2012 | Seo | B62D 57/032 | 700/261 |
| 2012/0158179 A1* | 6/2012 | Ooga | B25J 9/1633 | 700/259 |
| 2012/0303162 A1* | 11/2012 | Orita | B25J 9/1664 | 700/275 |
| 2013/0144441 A1* | 6/2013 | Kanazawa | B25J 9/1607 | 700/263 |

OTHER PUBLICATIONS

Sardain et al., "Forces Acting on a Biped Robot. Center of Pressure-Zero Moment Point", IEEE Transactions on Systems, Man, and Cybernetics—Part A: Systems and Humans, vol. 34, No. 5, Sep. 2004, p. 630-637.

Zero Moment Point (ZMP), [Retrieved on Apr. 21, 2016] from Internet: http://www.elysium-labs.com/robotics-corner/learn-robotics/biped-basics/zero-moment-point-zmp/.

Zero moment point, Wikipedia, [Retrieved on Apr. 21, 2016] from Internet: https://en.wikipedia.org/wiki/Zero_moment_point.

* cited by examiner

METHODS AND SYSTEMS FOR FORCE SENSOR CALIBRATION

BACKGROUND

As technology advances, various types of robotic devices are being created for performing a variety of functions that may assist users. Robotic devices may be used for applications involving material handling, transportation, welding, assembly, and dispensing, among others. Over time, the manner in which these robotic systems operate is becoming more intelligent, efficient, and intuitive. As robotic systems become increasingly prevalent in numerous aspects of modern life, the desire for efficient robotic systems becomes apparent. Therefore, a demand for efficient robotic systems has helped open up a field of innovation in actuators, movement, sensing techniques, as well as component design and assembly.

SUMMARY

The present disclosure generally relates to calibration of force sensors in a robot. Specifically, implementations described herein may allow for the calibration of a force sensor associated with a foot of a robot by causing just an edge of a sole of the foot to contact a surface. Beneficially, such calibration of the force sensor may improve the robot's determination of a zero moment point (ZMP) during bipedal movement, which may in turn improve the stability of the robot.

A first example implementation may include causing a foot of a robot to orient in a first position, where the foot comprises a sole configured to contact a surface, where the sole comprises a first edge and a second edge, and where in the first position: (i) the first edge of the sole contacts the surface, and (ii) a ZMP is located on the first edge of the sole of the foot where a sum of a plurality of moments acting about the first edge is substantially equal to zero; receiving, from a force sensor associated with the foot of the robot, (i) first force data indicative of a first force acting at a measurement location on the robot and (ii) first moment data indicative of a first moment acting about the measurement location; determining, by a computing device, a calibration of the force sensor based at least in part on the first force data, the first moment data, and a distance between the ZMP and the measurement location; and while the robot is engaged in bipedal movement, controlling the bipedal movement of the robot on the surface based at least in part on the calibration of the force sensor.

A second example implementation may include a system having means for performing operations in accordance with the first example implementation.

A third example implementation may include a robot having a foot, where the foot comprises a sole configured to contact a surface, where the sole comprises a first edge and a second edge; a force sensor associated with the foot; a processor; a non-transitory computer readable medium; and program instructions stored on the non-transitory computer readable medium that, when executed by the processor, cause the robot to perform operations in accordance with the first example implementation.

A fourth example implementation may include a non-transitory computer readable medium having stored therein program instructions executable by a computing device to cause the computing device to perform operations in accordance with the first example implementation.

These as well as other implementations, aspects, advantages, and alternatives will become apparent to those of ordinary skill in the art by reading the following description, with reference where appropriate to the accompanying drawings.

DETAILED DESCRIPTION

Figure 1:
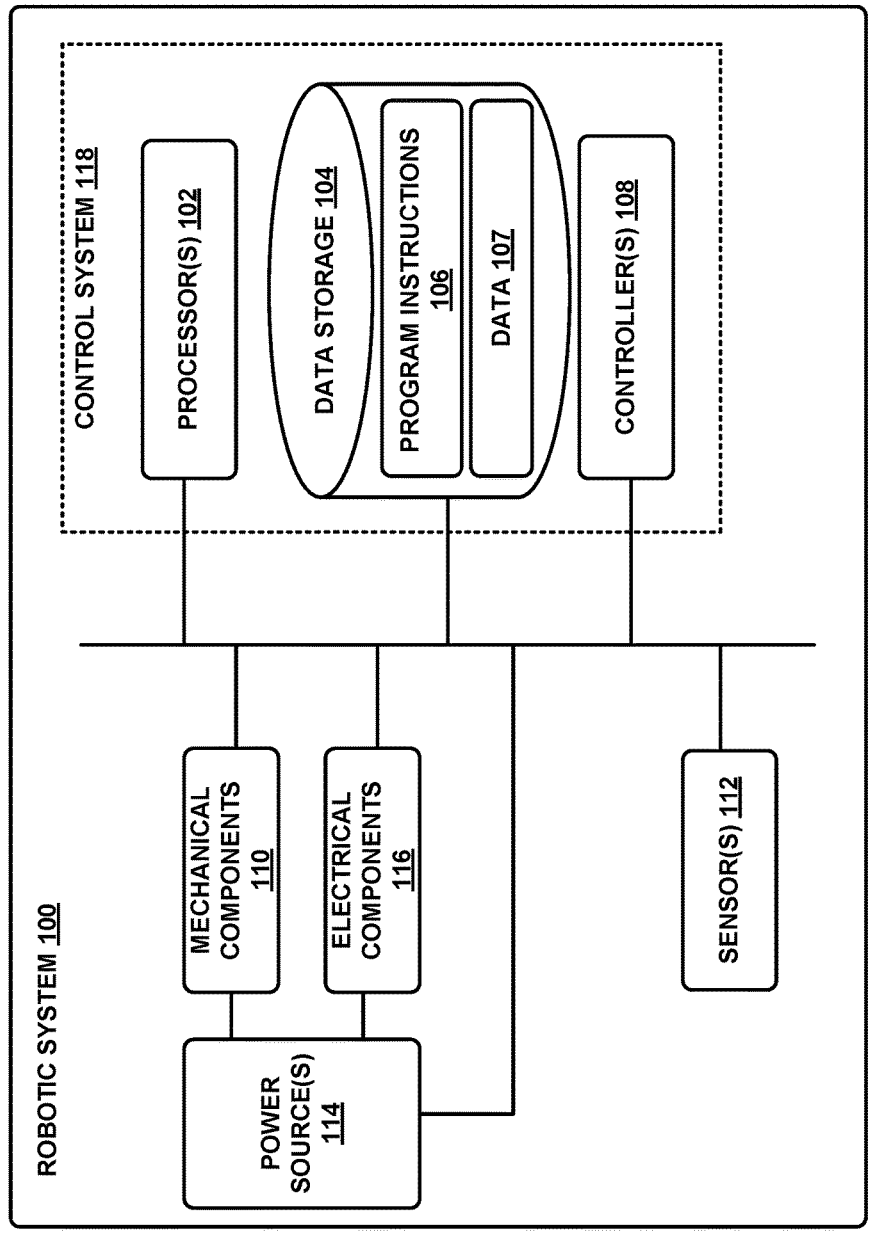
FIG. 1 illustrates a configuration of a robotic system, according to an example implementation.

Example implementations are described herein. The words "example," "exemplary," and "illustrative" are used herein to mean "serving as an example, instance, or illustration." Any implementation or feature described herein as being an "example," being "exemplary," or being "illustrative" is not necessarily to be construed as preferred or advantageous over other implementations or features. The example implementations described herein are not meant to be limiting. Thus, the aspects of the present disclosure, as generally described herein and illustrated in the figures, can be arranged, substituted, combined, separated, and designed in a wide variety of different configurations, all of which are contemplated herein. Further, unless otherwise noted, figures are not drawn to scale and are used for illustrative purposes only. Moreover, the figures are representational only and not all components are shown. For example, additional structural or restraining components might not be shown.

I. OVERVIEW

Example implementations relate to force sensor calibration. A legged robot may include force sensors that provide information to the robot regarding the ground reaction forces acting on the robot as it contacts a surface. For instance, a robot may include a force sensor in each of its feet, measuring forces along three perpendicular axes. However, each force sensor may be subject to offset (or drift) for a variety of reasons including temperature variations, or deformation of the sensor based on the cumulative impact of the robot's steps. Other causes of sensor offset are also possible.

To compensate for offset in the sensor measurements (or readings), the robot may calibrate its sensors when the forces and/or moments on the sensors are known, by comparing the measured force and/or moment values to the known or expected values. In some examples, a calibration of the force sensor may include (i) a value that associates data indicative of a ground reaction force with the actual ground reaction force and (ii) a value that associates data indicative of a moment acting on the robot with an actual moment acting on the robot. Once the calibration of the force sensor is determined, future sensor measurements may be adjusted. For example, the future sensor measurements may be updated based on the calibration of the force sensor.

In some implementations, force sensor calibration may be performed by putting a known load at a known position on the force sensor. However, this type of calibration may be time consuming and require additional equipment. Moreover, in some instances, it may be desirable to calibrate a robot's force sensor while the robot is standing in a stable posture.

In an illustrative implementation, a foot of a robot may include a sole configured to contact a surface and include a first edge and a second edge, and a force sensor may be calibrated by causing the first edge to contact the surface. For example, a method may involve causing the foot to orient in a first position, where in the first position the first edge contacts the surface and a zero moment point (ZMP) is located on the first edge. The method may involve receiving, from the force sensor, first force data indicative of a first force acting at a measurement location on the robot, and receiving, from the force sensor, first moment data indicative of a first moment acting about the measurement location. The method may involve determining, by a computing device, a calibration of the force sensor based at least in part on the first force data, the first moment data, and a distance between the ZMP and the measurement location. And the method may involve while the robot is engaged in bipedal movement, controlling the bipedal movement of the robot on the surface based at least in part on the calibration of the force sensor.

Further, in some implementations, the accuracy of the calibration of the force sensor may be improved by taking another sensor measurement when the first edge contacts the surface a second time. Yet further, in some implementations, the accuracy of the calibration of the force sensor may be improved by causing another edge of the sole of the foot to contact the surface, such as the second edge.

Moreover, in some implementations, determining a calibration of the force sensor may occur periodically, from time to time, or in response to various triggers. For example, in some implementations, determining to calibrate the force sensor may be based at least in part on receiving an indication that the robot has engaged in bipedal movement for a predetermined time or an indication that the robot has engaged in bipedal movement for a predetermined distance.

Although the following disclosure will discuss a biped robot, the calibration concepts described herein are equally applicable in robots with more legs, such as a quadruped.

II. EXAMPLE ROBOTIC SYSTEMS

FIG. 1 illustrates an example configuration of a robotic system that may be used in connection with the implementations described herein. The robotic system 100 may be configured to operate autonomously, semi-autonomously, and/or using directions provided by user(s). The robotic system 100 may be implemented in various forms, such as a biped robot, quadruped robot, or some other arrangement. Furthermore, the robotic system 100 may also be referred to as a robot, robotic device, or mobile robot, among other designations.

As shown in FIG. 1, the robotic system 100 may include processor(s) 102, data storage 104, and controller(s) 108, which together may be part of a control system 118. The robotic system 100 may also include sensor(s) 112, power source(s) 114, mechanical components 110, and electrical components 116. Nonetheless, the robotic system 100 is shown for illustrative purposes, and may include more or fewer components. The various components of robotic system 100 may be connected in any manner, including wired or wireless connections. Further, in some examples, components of the robotic system 100 may be distributed among multiple physical entities rather than a single physical entity. Other example illustrations of robotic system 100 may exist as well.

Processor(s) 102 may operate as one or more general-purpose hardware processors or special purpose hardware processors (e.g., digital signal processors, application specific integrated circuits, etc.). The processor(s) 102 may be configured to execute computer-readable program instructions 106, and manipulate data 107, both of which are stored in the data storage 104. The processor(s) 102 may also directly or indirectly interact with other components of the robotic system 100, such as sensor(s) 112, power source(s) 114, mechanical components 110, and/or electrical components 116.

The data storage 104 may be one or more types of hardware memory. For example, the data storage 104 may include or take the form of one or more computer-readable storage media that can be read or accessed by processor(s) 102. The one or more computer-readable storage media can include volatile and/or non-volatile storage components, such as optical, magnetic, organic, or another type of memory or storage, which can be integrated in whole or in part with processor(s) 102. In some implementations, the data storage 104 can be a single physical device. In other implementations, the data storage 104 can be implemented using two or more physical devices, which may communicate with one another via wired or wireless communication. As noted previously, the data storage 104 may include the computer-readable program instructions 106 and the data 107. The data 107 may be any type of data, such as configuration data, sensor data, and/or diagnostic data, among other possibilities.

The controller 108 may include one or more electrical circuits, units of digital logic, computer chips, and/or microprocessors that are configured to (perhaps among other tasks), interface between any combination of the mechanical components 110, the sensor(s) 112, the power source(s) 114, the electrical components 116, the control system 118, and/or a user of the robotic system 100. In some implementations, the controller 108 may be a purpose-built embedded device for performing specific operations with one or more subsystems of the robotic device 100.

The control system 118 may monitor and physically change the operating conditions of the robotic system 100. In doing so, the control system 118 may serve as a link between portions of the robotic system 100, such as between mechanical components 110 and/or electrical components 116. In some instances, the control system 118 may serve as an interface between the robotic system 100 and another computing device. Further, the control system 118 may serve as an interface between the robotic system 100 and a user. The instance, the control system 118 may include various components for communicating with the robotic system 100, including a joystick, buttons, and/or ports, etc. The example interfaces and communications noted above may be implemented via a wired or wireless connection, or both. The control system 118 may perform other operations for the robotic system 100 as well.

During operation, the control system 118 may communicate with other systems of the robotic system 100 via wired or wireless connections, and may further be configured to communicate with one or more users of the robot. As one possible illustration, the control system 118 may receive an input (e.g., from a user or from another robot) indicating an instruction to perform a particular gait in a particular direction, and at a particular speed. A gait is a pattern of movement of the limbs of an animal, robot, or other mechanical structure.

Based on this input, the control system 118 may perform operations to cause the robotic device 100 to move according to the requested gait. As another illustration, a control system may receive an input indicating an instruction to move to a particular geographical location. In response, the control system 118 (perhaps with the assistance of other components or systems) may determine a direction, speed, and/or gait based on the environment through which the robotic system 100 is moving en route to the geographical location.

Operations of the control system 118 may be carried out by the processor(s) 102. Alternatively, these operations may be carried out by the controller 108, or a combination of the processor(s) 102 and the controller 108. In some implementations, the control system 118 may partially or wholly reside on a device other than the robotic system 100, and therefore may at least in part control the robotic system 100 remotely.

Mechanical components 110 represent hardware of the robotic system 100 that may enable the robotic system 100 to perform physical operations. As a few examples, the robotic system 100 may include physical members such as leg(s), arm(s), and/or wheel(s). The physical members or other parts of robotic system 100 may further include actuators arranged to move the physical members in relation to one another. The robotic system 100 may also include one or more structured bodies for housing the control system 118 and/or other components, and may further include other types of mechanical components. The particular mechanical components 110 used in a given robot may vary based on the design of the robot, and may also be based on the operations and/or tasks the robot may be configured to perform.

In some examples, the mechanical components 110 may include one or more removable components. The robotic system 100 may be configured to add and/or remove such removable components, which may involve assistance from a user and/or another robot. For example, the robotic system 100 may be configured with removable arms, hands, feet, and/or legs, so that these appendages can be replaced or changed as needed or desired. In some implementations, the robotic system 100 may include one or more removable and/or replaceable battery units or sensors. Other types of removable components may be included within some implementations.

The robotic system 100 may include sensor(s) 112 arranged to sense aspects of the robotic system 100. The sensor(s) 112 may include one or more force sensors, torque sensors, velocity sensors, acceleration sensors, position sensors, proximity sensors, motion sensors, location sensors, load sensors, temperature sensors, touch sensors, depth sensors, ultrasonic range sensors, infrared sensors, object sensors, and/or cameras, among other possibilities. Within some examples, the robotic system 100 may be configured to receive sensor data from sensors that are physically separated from the robot (e.g., sensors that are positioned on other robots or located within the environment in which the robot is operating).

The sensor(s) 112 may provide sensor data to the processor(s) 102 (perhaps by way of data 107) to allow for interaction of the robotic system 100 with its environment, as well as monitoring of the operation of the robotic system 100. The sensor data may be used in evaluation of various factors for activation, movement, and deactivation of mechanical components 110 and electrical components 116 by control system 118. For example, the sensor(s) 112 may capture data corresponding to the terrain of the environment or location of nearby objects, which may assist with environment recognition and navigation. In an example configuration, sensor(s) 112 may include RADAR (e.g., for long-range object detection, distance determination, and/or speed determination), LIDAR (e.g., for short-range object detection, distance determination, and/or speed determination), SONAR (e.g., for underwater object detection, distance determination, and/or speed determination), VICON® (e.g., for motion capture), one or more cameras (e.g., stereoscopic cameras for 3D vision), a global positioning system (GPS) transceiver, and/or other sensors for capturing information of the environment in which the robotic system 100 is operating. The sensor(s) 112 may monitor the environment in real time, and detect obstacles, elements of the terrain, weather conditions, temperature, and/or other aspects of the environment.

Further, the robotic system 100 may include sensor(s) 112 configured to receive information indicative of the state of the robotic system 100, including sensor(s) 112 that may monitor the state of the various components of the robotic system 100. The sensor(s) 112 may measure activity of systems of the robotic system 100 and receive information based on the operation of the various features of the robotic system 100, such the operation of extendable legs, arms, or other mechanical and/or electrical features of the robotic system 100. The data provided by the sensor(s) 112 may enable the control system 118 to determine errors in operation as well as monitor overall operation of components of the robotic system 100.

As an example, the robotic system 100 may use force sensors to measure load on various components of the robotic system 100. In some implementations, the robotic system 100 may include one or more force sensors on an arm or a leg to measure the load on the actuators that move one or more members of the arm or leg. As another example, the robotic system 100 may use one or more position sensors to sense the position of the actuators of the robotic system. For instance, such position sensors may sense states of extension, retraction, or rotation of the actuators on arms or legs.

As another example, the sensor(s) 112 may include one or more velocity and/or acceleration sensors. For instance, the sensor(s) 112 may include an inertial measurement unit (IMU). The IMU may sense velocity and acceleration in the world frame, with respect to the gravity vector. The velocity and acceleration sensed by the IMU may then be translated to that of the robotic system 100 based on the location of the IMU in the robotic system 100 and the kinematics of the robotic system 100.

The robotic system 100 may include other types of sensors not explicated discussed herein. Additionally or alternatively, the robotic system may use particular sensors for purposes not enumerated herein.

The robotic system 100 may also include one or more power source(s) 114 configured to supply power to various components of the robotic system 100. Among other possible power systems, the robotic system 100 may include a hydraulic system, electrical system, batteries, and/or other types of power systems. As an example illustration, the robotic system 100 may include one or more batteries configured to provide charge to components of the robotic system 100. Some of the mechanical components 110 and/or electrical components 116 may each connect to a different power source, may be powered by the same power source, or be powered by multiple power sources.

Any type of power source may be used to power the robotic system 100, such as electrical power or a gasoline engine. Additionally or alternatively, the robotic system 100 may include a hydraulic system configured to provide power to the mechanical components 110 using fluid power. Components of the robotic system 100 may operate based on hydraulic fluid being transmitted throughout the hydraulic system to various hydraulic motors and hydraulic cylinders, for example. The hydraulic system may transfer hydraulic power by way of pressurized hydraulic fluid through tubes, flexible hoses, or other links between components of the robotic system 100. The power source(s) 114 may charge using various types of charging, such as wired connections to an outside power source, wireless charging, combustion, or other examples.

The electrical components 116 may include various mechanisms capable of processing, transferring, and/or providing electrical charge or electric signals. Among possible examples, the electrical components 116 may include electrical wires, circuitry, and/or wireless communication transmitters and receivers to enable operations of the robotic system 100. The electrical components 116 may interwork with the mechanical components 110 to enable the robotic system 100 to perform various operations. The electrical components 116 may be configured to provide power from the power source(s) 114 to the various mechanical components 110, for example. Further, the robotic system 100 may include electric motors. Other examples of electrical components 116 may exist as well.

Although not shown in FIG. 1, the robotic system 100 may include a body, which may connect to or house appendages and components of the robotic system. As such, the structure of the body may vary within examples and may further depend on particular operations that a given robot may have been designed to perform. For example, a robot developed to carry heavy loads may have a wide body that enables placement of the load. Similarly, a robot designed to reach high speeds may have a narrow, small body that does not have substantial weight. Further, the body and/or the other components may be developed using various types of materials, such as metals or plastics. Within other examples, a robot may have a body with a different structure or made of various types of materials.

The body and/or the other components may include or carry the sensor(s) 112. These sensors may be positioned in various locations on the robotic device 100, such as on the body and/or on one or more of the appendages, among other examples.

On its body, the robotic device 100 may carry a load, such as a type of cargo that is to be transported. The load may also represent external batteries or other types of power sources (e.g., solar panels) that the robotic device 100 may utilize. Carrying the load represents one example use for which the robotic device 100 may be configured, but the robotic device 100 may be configured to perform other operations as well.

As noted above, the robotic system 100 may include various types of legs, arms, wheels, and so on. In general, the robotic system 100 may be configured with zero or more legs. An implementation of the robotic system with zero legs may include wheels, treads, or some other form of locomotion. An implementation of the robotic system with two legs may be referred to as a biped, and an implementation with four legs may be referred as a quadruped. Implementations with six or eight legs are also possible. For purposes of illustration, biped and quadruped implementations of the robotic system 100 are described below.

Figure 2:
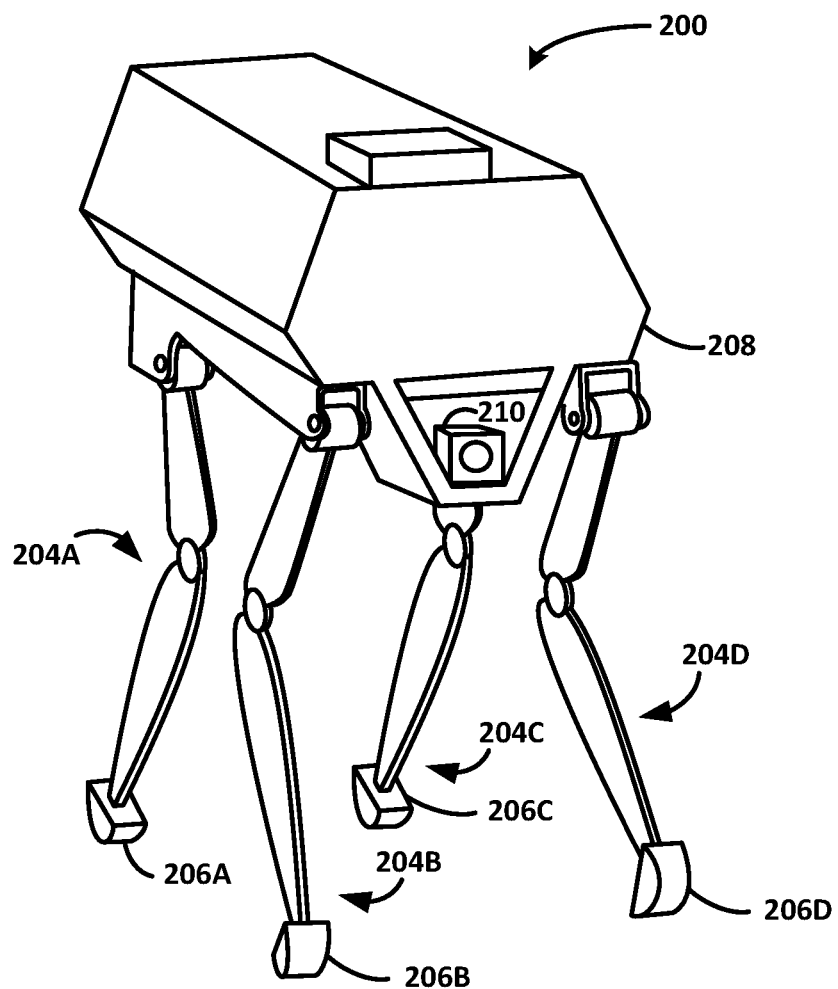
FIG. 2 illustrates a quadruped robot, according to an example implementation.

FIG. 2 illustrates a quadruped robot 200, according to an example implementation. Among other possible features, the robot 200 may be configured to perform some of the operations described herein. The robot 200 includes a control system, and legs 204A, 204B, 204C, 204D connected to a body 208. Each leg may include a respective foot 206A, 206B, 206C, 206D that may contact a surface (e.g., a ground surface). Further, the robot 200 is illustrated with sensor(s) 210, and may be capable of carrying a load on the body 208. Within other examples, the robot 200 may include more or fewer components, and thus may include components not shown in FIG. 2.

The robot 200 may be a physical representation of the robotic system 100 shown in FIG. 1, or may be based on other configurations. Thus, the robot 200 may include one or more of mechanical components 110, sensor(s) 112, power source(s) 114, electrical components 116, and/or control system 118, among other possible components or systems.

The configuration, position, and/or structure of the legs 204A-204D may vary in example implementations. The legs 204A-204D enable the robot 200 to move relative to its environment, and may be configured to operate in multiple degrees of freedom to enable different techniques of travel. In particular, the legs 204A-204D may enable the robot 200 to travel at various speeds according to the mechanics set forth within different gaits. The robot 200 may use one or more gaits to travel within an environment, which may involve selecting a gait based on speed, terrain, the need to maneuver, and/or energy efficiency.

Further, different types of robots may use different gaits due to variations in design. Although some gaits may have specific names (e.g., walk, trot, run, bound, gallop, etc.), the distinctions between gaits may overlap. The gaits may be classified based on footfall patterns—the locations on a surface for the placement the feet 206A-206D. Similarly, gaits may also be classified based on ambulatory mechanics.

The body 208 of the robot 200 connects to the legs 204A-204D and may house various components of the robot 200. For example, the body 208 may include or carry sensor(s) 210. These sensors may be any of the sensors discussed in the context of sensor(s) 112, such as a camera, LIDAR, or an infrared sensor. Further, the locations of sensor(s) 210 are not limited to those illustrated in FIG. 2. Thus, sensor(s) 210 may be positioned in various locations on the robot 200, such as on the body 208 and/or on one or more of the legs 204A-204D, among other examples.

Figure 3:
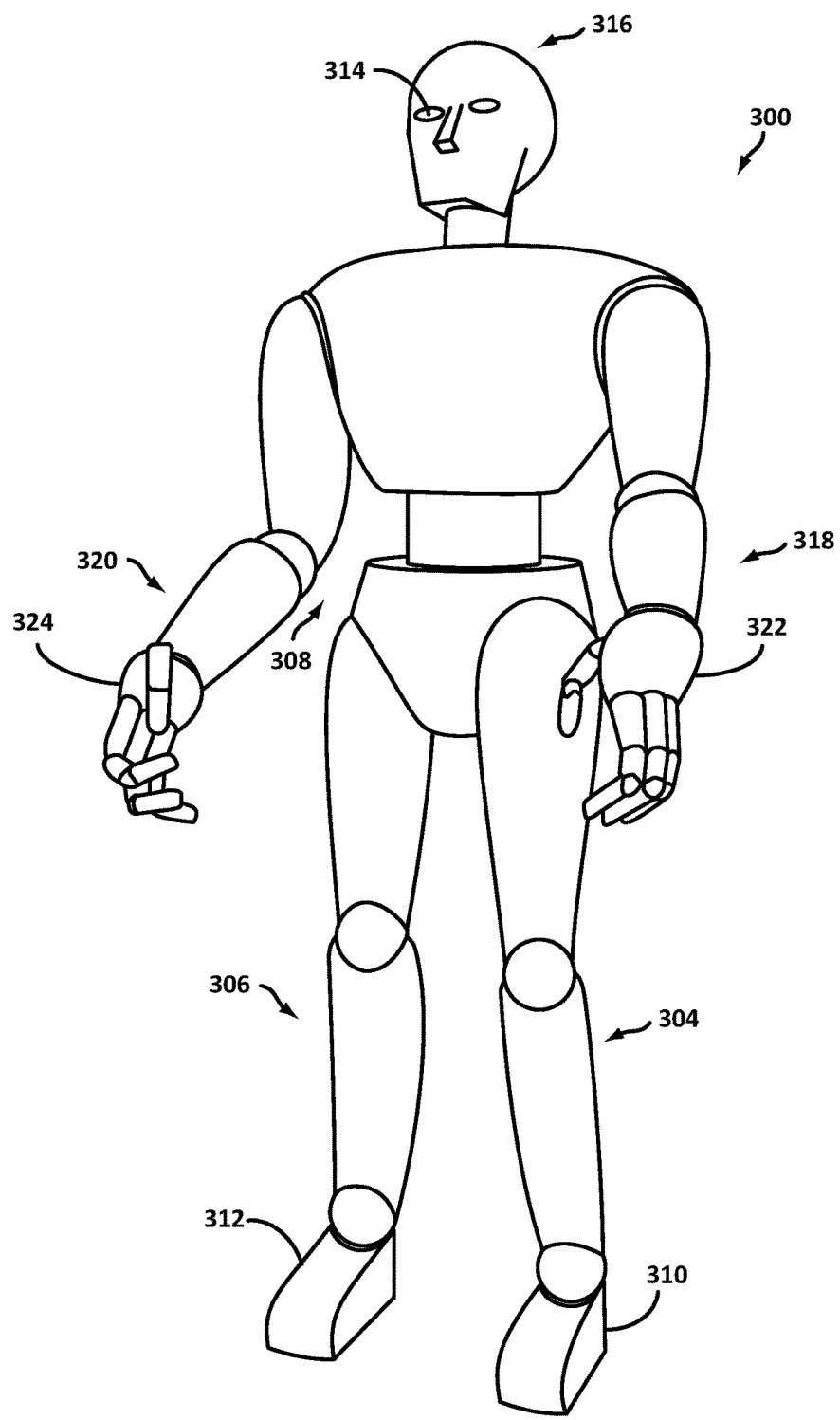
FIG. 3 illustrates a biped robot, according to an example implementation.

FIG. 3 illustrates a biped robot 300 according to another example implementation. Similar to robot 200, the robot 300 may correspond to the robotic system 100 shown in FIG. 1, and may be configured to perform some of the implementations described herein. Thus, like the robot 200, the robot 300 may include one or more of mechanical components 110, sensor(s) 112, power source(s) 114, electrical components 116, and/or control system 118.

For example, the robot 300 may include legs 304 and 306 connected to a body 308. Each leg may consist of one or more members connected by joints and configured to operate with various degrees of freedom with respect to one another. Each leg may also include a respective foot 310 and 312, which may contact a surface (e.g., the ground surface). Like the robot 200, the legs 304 and 306 may enable the robot 300 to travel at various speeds according to the mechanics set forth within gaits. The robot 300, however, may utilize different gaits from that of the robot 200, due at least in part to the differences between biped and quadruped capabilities.

The robot 300 may also include arms 318 and 320. These arms may facilitate object manipulation, load carrying, and/or balancing for the robot 300. Like legs 304 and 306, each arm may consist of one or more members connected by joints and configured to operate with various degrees of freedom with respect to one another. Each arm may also include a respective hand 322 and 324. The robot 300 may use hands 322 and 324 for gripping, turning, pulling, and/or pushing objects. The hands 322 and 324 may include various types of appendages or attachments, such as fingers, grippers, welding tools, cutting tools, and so on.

The robot 300 may also include sensor(s) 314, corresponding to sensor(s) 112, and configured to provide sensor data to its control system. In some cases, the locations of these sensors may be chosen in order to suggest an anthropomorphic structure of the robot 300. Thus, as illustrated in FIG. 3, the robot 300 may contain vision sensors (e.g., cameras, infrared sensors, object sensors, range sensors, etc.) within its head 316.

III. EXAMPLE CALIBRATION OF FORCE SENSOR

Figure 4:
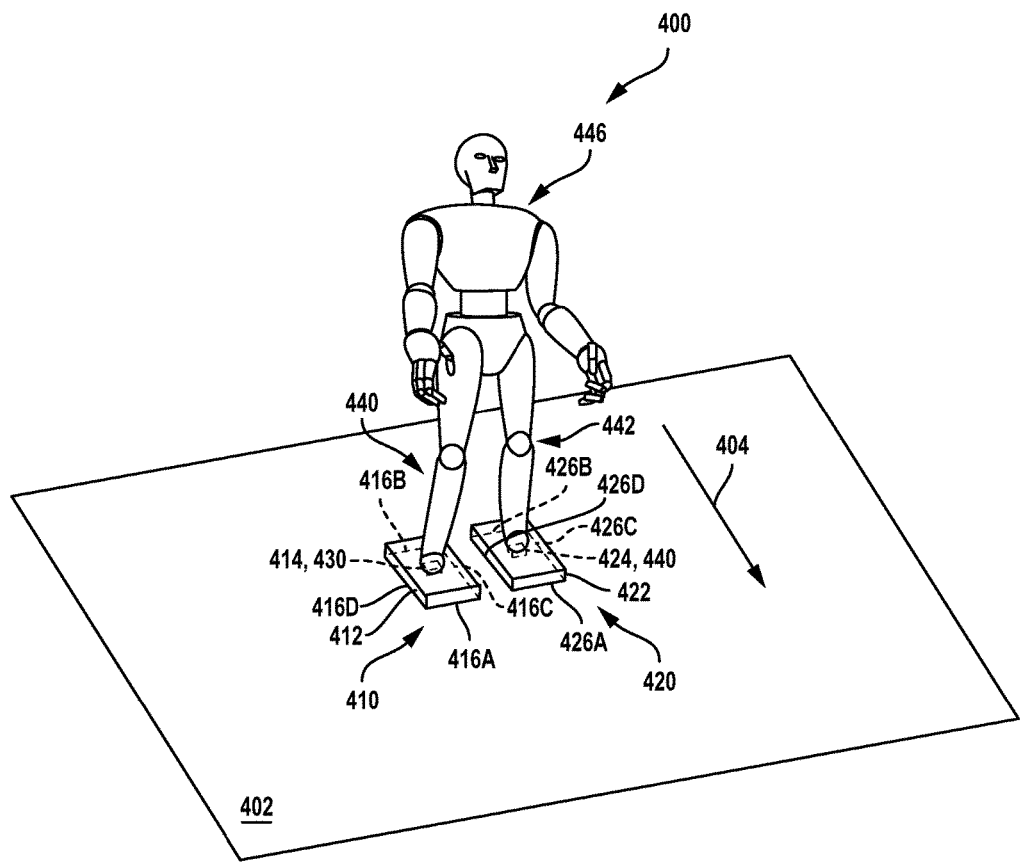
FIG. 4 illustrates a biped robot standing on a surface, according to an example implementation.

FIG. 4 illustrates a biped robot 400 standing on a surface 402, according to an example implementation. Similar to robot 200 and 300, the robot 400 may correspond to the robotic system 100 shown in FIG. 1, and may be configured to perform some of the implementations described herein. The robot 400 may include a first foot 410 and a second foot 420. In addition, the robot 400 may include components as described above in connection with robot 300, including legs 440 and 442 connected to a body 446, among other members and components. The robot 400 may be configured to move in a travel direction 404. For example, the robot 400 may be configured to move according to any gait in the travel direction 404.

As shown in FIG. 4, the first foot 410 may contact the surface 402 and may be substantially parallel to the surface 402. The term "substantially parallel," as used in this disclosure, refers to exactly parallel or one or more deviations from exactly parallel that do not significantly impact force sensor calibration as described herein (e.g., 1-3% off of parallel). The first foot 410 may include a sole 412 and a force sensor 414. The force sensor 414 may be configured to measure forces along three perpendicular axes. In some implementations, the force sensor 414 may generate data indicative of a force acting at a measurement location 430 (e.g., an ankle or other measurement locations where the force sensor 414 is located) on the robot 400 and/or generate data indicative of a moment acting about the measurement location on the robot 400. The force sensor 414 may take various different forms in various different implementations. For example, in some implementations, the force sensor 414 may include at least one strain gauge. Moreover, in some implementations, the force sensor 414 may be located on the first foot 410. For instance, in some such implementations, the force sensor 414 may be located on the sole 412. However, in other implementations, the force sensor 414 may be located on other components of the robot 400, such as the leg 440 and/or between an ankle joint of the robot 400 and the sole 412. Further, in some implementations, the force sensor 414 may be configured to measure forces along three perpendicular axes as well as moments (or torques) about those axes. With this arrangement, the sensor may be referred to a force/torque sensor.

The sole 412 may be configured to contact the surface 402 and may include four edges: a first edge 416A, a second edge 416B, a third edge 416C, and a fourth edge 416D. As shown in FIG. 4, the first edge 416A may be opposite the second edge 416B. Moreover, with respect to the travel direction 404, the first edge 416A may be an anterior edge, and the second edge 416B may be a posterior edge. In addition, the first edge 416A and second edge 416B may each be substantially perpendicular to the travel direction 404. The term "substantially perpendicular," as used in this disclosure, refers to exactly perpendicular or one or more deviations from exactly perpendicular that do not significantly impact force sensor calibration as described herein (e.g., 1-5% off perpendicular). Moreover, the third edge 416C and fourth edge 416D may each be substantially parallel to the travel direction 404.

Further, as shown in FIG. 4, a second foot 420 may take the form of or be similar in form to the first foot 410 and function in a similar manner. Accordingly, the second foot 420 may include a sole 422 and a force sensor 424, and the sole 422 may include four edges: a first edge 426A, a second edge 426B, a third edge 426C, and a fourth edge 426D. The sole 422 may take the form of or be similar in form to the sole 412, the force sensor 424 may take the form of or be similar to the force sensor 414, and the first edge 426A, the second edge 426B, the third edge 426C, and the fourth edge 426D may take the form of or be similar in form to the first edge 416A, the second edge 416B, the third edge 416C, and the fourth edge 416D, respectively. In addition, measurement location 440 on the robot 400 may take the form of or be similar in form to the measurement location 430.

Although the sole 412 and sole 422 are each described above as including four edges, in some implementations, the sole 412 and sole 422 may each include more or less than four edges, such as three edges, five edges, six edges, etc. Moreover, in some implementations, the sole 412 and sole 422 may have the same number of edges. However, in other implementations, the sole 412 may have more or less edges than the sole 422.

Figure 5:
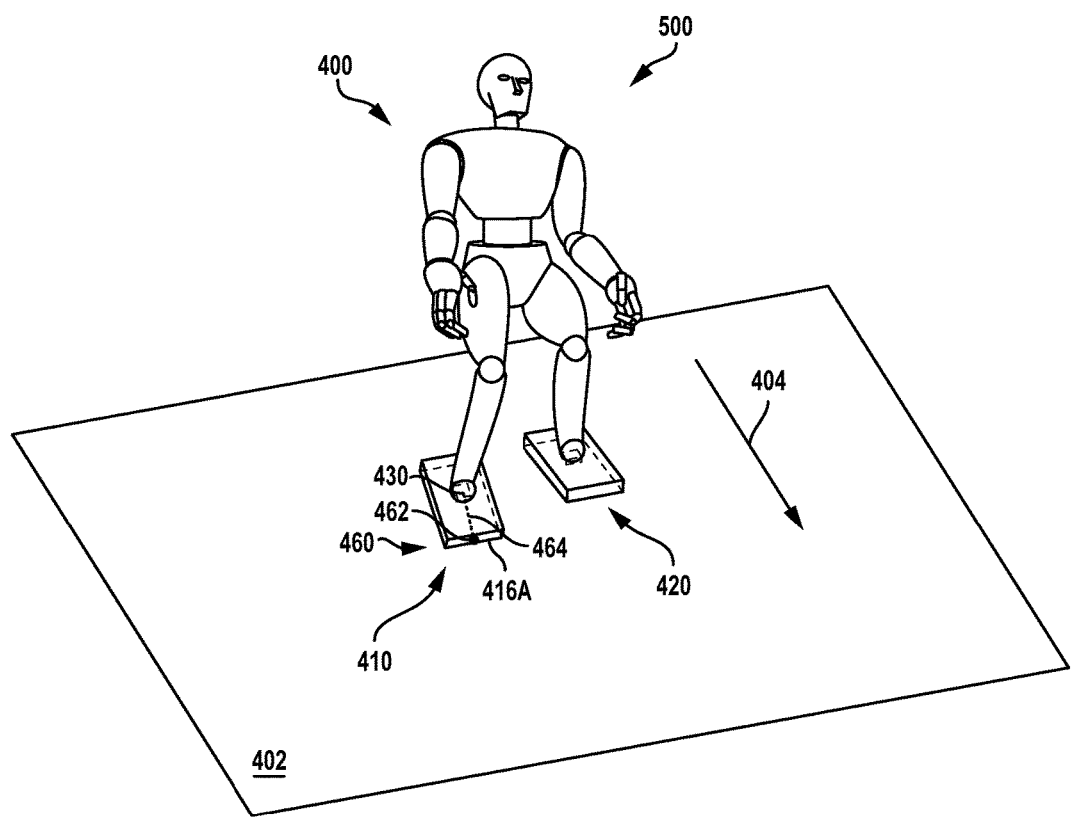
FIG. 5 illustrates an example calibration of a force sensor.

FIG. 5 illustrates an example calibration 500 of the force sensor 414. Example 500 may be carried out in whole or in part by a component or components of a robot. For simplicity, example 500 may be described generally as being carried out by the robot 400 as described above in connection with FIG. 4. However, examples, such as example 500, may be carried out by other entities or combination of entities (e.g., the control system 118) without departing from the scope of this disclosure. For illustrative purposes, example 500 is described in a series of phases, though example 500 could be carried out in any number of phases or combination of phases.

At a first phase of example 500, the robot 400 may cause the second foot 420 to be lifted off the surface 402, and thus the second foot 420 is in the air. The robot 400 may also cause the first foot 410 to orient in a first position 460, where in the first position 460 the first edge 416A contacts the surface 402. In this case, a ZMP 462 is located on the first edge 416A. In the first position 460, the second edge 416B, third edge 416C, and fourth edge 416D might not contact the surface 402. Further, in the first position 460, the first foot 410 may be non-parallel with the surface 402. Moreover, in the first position 460, a sum of a plurality of moments acting about the first edge 416A is substantially equal to zero. The term "substantially equal," as used in this disclosure, refers to exactly equal or one or more deviations from exactly equal that to not significantly impact force sensor calibration as described herein (e.g., within 3 Newtons (N) of force from equal). In the illustrated example, the ZMP 462 may be located at a midpoint of the first edge 416A. However, in other examples, the ZMP 462 may be located at other portions of the first edge 416A.

Further, at a second phase of example 500, the robot 400 may receive, from the force sensor 414, (i) first force data indicative of a first force acting at the measurement location 430 on the robot 400 and (ii) first moment data indicative of a first moment acting about the measurement location 430. In some implementations, the first moment may be a cross product of a force vector and a distance vector. Moreover, in some implementations, at the second phase of example 500, the robot 400 may receive, from the force sensor 414, the first force data, and the robot 400 may determine, based on the received first force data, the first moment data. In other implementations, the measurement location 430 may be located at other portions of the robot 400, such as the leg 440 and/or between the ankle joint of the robot 400 and the sole 412.

Yet further, at a third phase of example 500, the robot may determine a calibration of the force sensor 414 based at least in part on the first force data, the first moment data, and a distance 464 between the ZMP 462 and the measurement location 430.

One or more actions that correspond with the first phase, second phase, and third phase of example 500 may be performed at various different time periods in various different implementations. For instance, the one or more actions that correspond with the first phase may be performed at a first time period, the one or more actions that correspond with the second phase may be performed at a second time period, and the one or more actions that correspond with the third phase may be performed at a third time period. However, in other examples, at least some of the actions of the one or more actions that correspond with the first phase, second phase, and third phase may be performed concurrently.

Figure 6:
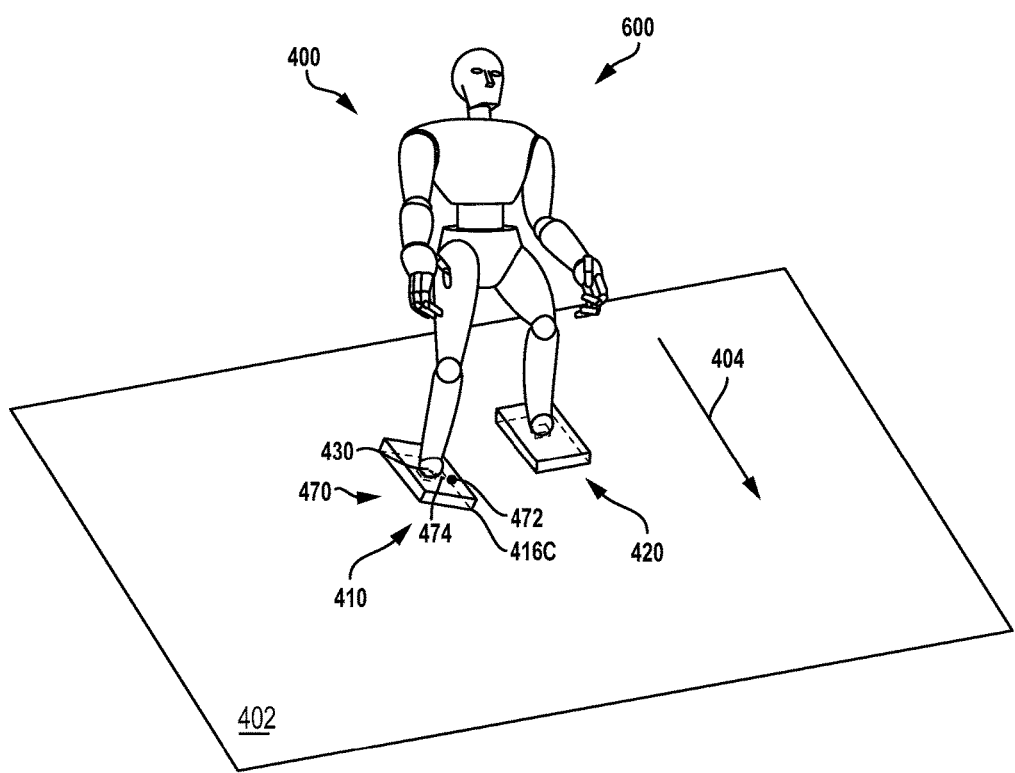
FIG. 6 illustrates an example calibration of a force sensor.

FIG. 6 illustrates an example calibration 600 of the force sensor 414. Example 600 is similar to example 500, except that in example 600 the robot 400 may cause the third edge 416C to contact the surface 402. Similar to example 500, example 600 may be described generally as being carried out by the robot 400 as described above in connection with FIG. 4, and for illustrative purposes, example 600 is described in a series of phases as shown in FIG. 6. In some implementations, example 600 may be performed in connection with example 500.

At a first phase in example 600, the robot 400 may cause the second foot 420 to be lifted off in the air, and cause the first foot 410 to orient in a second position 470, where in the second position 470 the third edge 416C contacts the surface 402. In this case, a ZMP 472 is located on the third edge 416C. Further, in the second position 470, the first edge 416A, second edge 416B, and fourth edge 416D might not contact the surface 402. In the second position 470, the first foot 410 is non-parallel with the surface 402. Moreover, in the second position 470, a sum of a plurality of moments acting about the third edge 416C is substantially equal to zero. Similar to example 500, in example 600, the ZMP 472 may be located at a midpoint of the third edge 416C. However, in other examples, the ZMP 472 may be located at other portions of the third edge 416C.

Further, at a second phase of example 600, the robot 400 may receive, from the force sensor 414, (i) second force data indicative of a second force acting at the measurement location 430 and (ii) second moment data indicative of a second moment acting about the measurement location 430. Moreover, in some implementations, at the second phase of example 600, the robot 400 may receive, from the force sensor 414, the second force data, and the robot 400 may determine, based on the received second force data, the second moment data.

Yet further, at a third phase of example 600, the robot may determine a calibration of the force sensor 414 based at least in part on the first force data, the first moment data, and a distance 474 between the ZMP 472 and the measurement location 430.

Similar to example 500, one or more actions that correspond with the first phase, second phase, and third phase of example 600 may be performed at various different time periods in various different implementations. For instance, the one or more actions that correspond with the first phase may be performed at a first time period, the one or more actions that correspond with the second phase may be performed at a second time period, and the one or more actions that correspond with the third phase may be performed at a third time period. However, in other examples, at least some of the actions of the one or more actions that correspond with the first phase, second phase, and third phase may be performed concurrently.

Further, the force sensor 414 may be calibrated by causing the second edge 416B to contact the surface 402. In some implementations, calibrating the force sensor 414 by causing the second edge 416B to contact the surface 402 may be similar to example 500 and/or example 600. Yet further, the force sensor 414 may be calibrated by causing the fourth edge 416D to contact the surface 402. In some implementations, calibrating the force sensor 414 by causing the fourth edge 416B to contact the surface may be similar to example 500 and/or example 600.

Moreover, the force sensor 424 may be calibrated by causing a particular edge of the sole 422 of the second foot 420 to contact the surface 402, such as the first edge 426A, the second edge 426B, the third edge 426C, and the fourth edge 426D, while the first foot 410 is in the air. Calibrating the force sensor 424 by causing the first edge 426A, the second edge 426B, the third edge 426C, or the fourth edge 426D to contact the surface 402 may be similar to example 500 and/or example 600.

In some implementations, the calibration of the force sensor 414 and/or the calibration of the force sensor 424 may be used while the robot 400 is engaged in bipedal movement. For example, while the robot 400 is engaged in bipedal movement, the bipedal movement of the robot 400 on the surface 402 may be controlled based at least in part on the calibration of the force sensor 414 and/or the calibration of the force sensor 424. For instance, while the robot 400 is engaged in bipedal movement, the robot 400 may calculate a ZMP based on one or more measurements of the force sensor 414 and/or one or more measurements of the force sensor 424. Beneficially, the calibration of the force sensor 414 and/or the calibration of the force sensor 424 may improve the accuracy of the ZMP calculation of the robot 400, which may in turn improve the stability of the robot 400.

Figure 7:
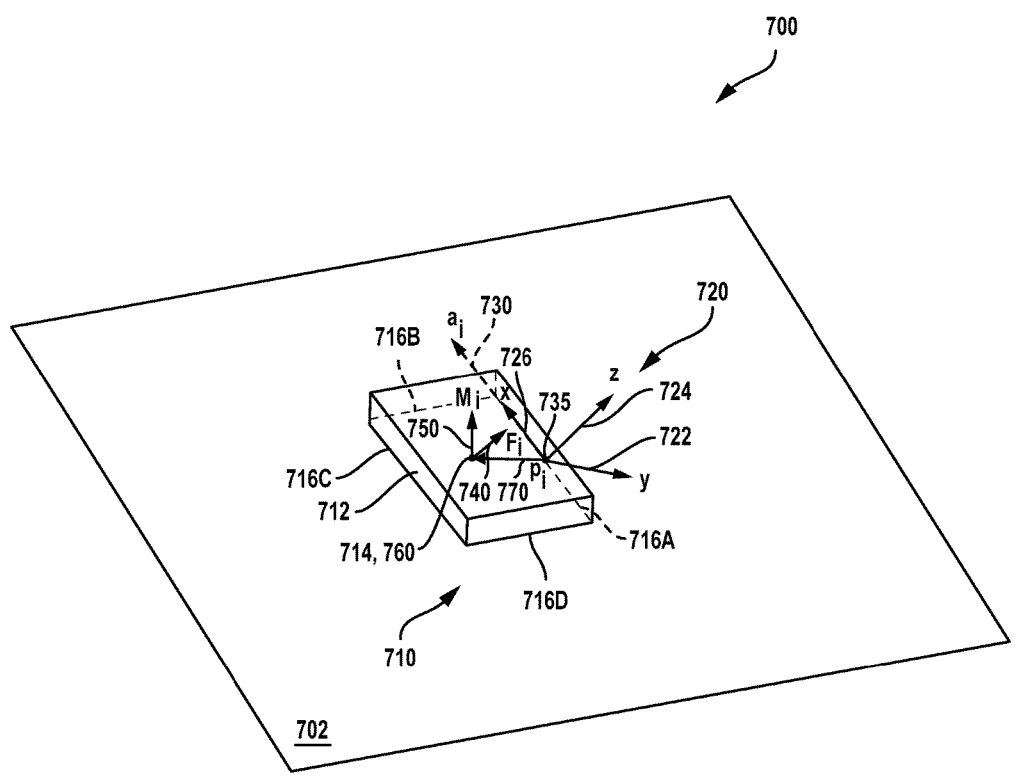
FIG. 7 illustrates aspects of a biped robot, according to an example implementation.

FIG. 7 illustrates aspects of a robot 700, according to an example implementation. In particular, FIG. 7 illustrates that the robot 700 may include a first foot 710. The foot 710 may include a sole 712 and a force sensor 714, and the sole 712 may include four edges: a first edge 716A, a second edge 716B, a third edge 716C, and a fourth edge 716D. Components in FIG. 7 similar to those in FIGS. 4-6 may be of the same configuration and may function in a similar manner.

As shown in FIG. 7, the foot 710 may be tipped so that a particular edge (e.g., the first edge 716A) contacts a surface 702. Coordinate system 720 is disposed along the particular edge, and the coordinate system includes a y-axis 722, a z-axis 724, and an x-axis 726. In addition, a unit vector ($a_1$) 730 is located along the particular edge. In some implementations, the unit vector 730 may be a three-element unit vector. With a second foot (not shown) of the robot in the air and the first foot 710 tipped so that the particular edge contacts the surface 702, a ZMP 735 is on the particular edge, and a torque along the unit vector 730 is substantially equal to zero. A real force ($F_1$) 740 at the force sensor 714 acts on the robot 700 and is associated with a ground reaction force. A real moment ($M_i$) 750 also acts at the force sensor 714. The force sensor 714 measures the force 740 and the moment 750 at a measurement location 760 on the robot 700. In some implementations, the force sensor 714 may measure the force 740, and the robot 700 may determine, based on the measured force 740, the moment 750. A distance vector ($p_i$) 770 connects the ZMP 735 with the measurement location 760.

In some implementations, the distance vector 770 may be a three-element vector. Further, in some such implementations, the distance vector 770 may have an element corresponding with the y-axis 722, z-axis 724, and x-axis 726.

In this disclosure, the notation "i" may refer to a particular edge or a number of sensor measurements at the particular edge. Further, the force sensor 714 may measure force data ($F_i^*$) indicative of the force 740, and may measure moment data ($M_i^*$) indicative of the moment 750. In some implementations, the force 740, the moment 750, force data, and moment data may each be a three-element vector. Moreover, in some such implementations, each such vector may have an element corresponding with the y-axis 722, z-axis 724, and x-axis 726.

Further, because the ZMP 735 is on the first edge 716A, the torque about the unit vector 730 may be zero. Thus, as shown in equation [1]:

$$a_i \cdot (M_i - p_i \times F_i) = 0 \quad [1]$$

In addition, a calibration of the force sensor 714 may include a force offset (Fo) and a moment offset (Mo), and, as shown in equation [2], the force offset may be associated with the force 740 and the moment offset may be associated with the moment 750 as follows:

$$M_i = M_i^* + Mo$$

$$F_i = F_i^* + Fo \quad [2]$$

In some implementations, the force 740, the moment 750, force data, and moment data may each be a three-element vector. Moreover, in some such implementations, each such vector may have an element corresponding with the y-axis 722, z-axis 724, and x-axis 726.

Further, as shown in equation [3], the force offset and moment offset are related to a pseudoinverse of a first matrix (A) and a second matrix (b) as follows:

$$\begin{bmatrix} Mo \\ Fo \end{bmatrix} = A^+ b \quad [3]$$

In some implementations, equation [3] may involve matrix multiplication of (i) the pseudoinverse of the first matrix and (ii) the second matrix. Generally, a pseudoinverse of a matrix may be used to compute a least squares solution to a system of linear equations, or a minimum norm solution to a system of linear equations. In some implementations, the pseudoinverse of the first matrix may be equal to a transpose of the first matrix. Generally, rows of the first matrix may correspond with columns of the transpose of the first matrix, and columns of the first matrix may correspond with rows of the transpose of the first matrix.

Further, in some implementations, the pseudoinverse of the first matrix may be based on the distance vector 770 as shown in equation [4]:

$$A = {}^t\begin{bmatrix} a_i \\ -a_i \hat{P}_i \end{bmatrix} \quad [4]$$

$A^+$ is the pseudoinverse of A and can be calculated, for example, using least-squares method.

In equation [4], $\hat{P}_i$ is equal to $(p_i \times)$, which is the cross product of $p_i$. $\hat{P}_i$ may be based on the distance vector 770 as shown in equation [5]:

$$p_i \times = \hat{P}_i = \begin{bmatrix} 0 & -pz_i & py_i \\ pz_i & 0 & -px_i \\ -py_i & px_i & 0 \end{bmatrix} \quad [5]$$

In equation [5], the notation "$px_i$" may refer to an element of $p_i$ corresponding with the x-axis 726, "$pz_i$" may refer to an element of $p_i$ corresponding with the z-axis 724, and "$py_i$" may refer to an element of $p_i$ corresponding with the y-axis 722.

Yet further, in some implementations, the second matrix may be based on the first moment data and the distance vector 770, as shown in equation [6]:

$$b = [-a_i(M_i^* - \hat{P}_i F_i^*)] \quad [6]$$

Generally, equation [3] may be defined from equations [1], [2], and [5] as shown in equations [7] to [10]:

$$a_i \cdot \{(M_i^* + Mo) - \hat{P}_i(F_i^* + Fo)\} = 0 \rightarrow a_i M_i^* + a_i Mo - a_i \hat{P}_i F_i^* - a_i \hat{P}_i Fo = 0 \quad [7]$$

$$a_i \cdot (Mo - \hat{P}_i Fo) = -a_i \cdot (M_i^* - \hat{P}_i F_i^*) \quad [8]$$

$$\begin{bmatrix} a_i & -a_i \hat{P}_i \end{bmatrix} \begin{bmatrix} Mo \\ Fo \end{bmatrix} = -a_i (M_i^* - \hat{P}_i F_i^*) \quad [9]$$

$${}^t\begin{bmatrix} a_i \\ -a_i \hat{P}_i \end{bmatrix} \begin{bmatrix} Mo \\ Fo \end{bmatrix} = -a_i(M_i^* - \hat{P}_i F_i^*) \quad [10]$$

A. First Example Implementation: One Measurement at an Edge

In a first example implementation, the first foot 710 may be tipped so that the first edge 716A contacts the surface 702 and the force sensor 714 may take one measurement. In such an example implementation, the first matrix A and the second matrix b may take the form as shown in equation [11]:

$$A = {}^t\begin{bmatrix} a_i \\ -a_i\hat{P}_i \end{bmatrix} \quad b = \begin{bmatrix} -a_i(M_i^* - \hat{P}_i F_i^*) \end{bmatrix} \quad [11]$$

In equation [11], the pseudoinverse of the first matrix A may be a two by one matrix (2×1). In addition, in equation [11], the second matrix b may be a one by one matrix (1×1). Accordingly, the force offset and the moment offset may be determined by matrix multiplication of the psuedoinverse of the first matrix and the second matrix as shown in equation [12]:

$$\begin{bmatrix} Mo \\ Fo \end{bmatrix} = A^+ b, \text{ where } A \text{ and } b \text{ are defined by equation [11]} \quad [12]$$

Although the first example implementation described above involved tipping the foot 710 so that the first edge 716A contacts the surface 702, in other implementations, the foot 710 may be tipped so that the second edge 716B, third edge 716C, or fourth edge 716D contacts the surface 702. In such implementations, the force offset and moment offset may be determined in a similar manner as in the first example implementation.

B. Second Example Implementation: Two Measurements at an Edge

In some implementations, an accuracy of the calibration of the force sensor 714 may be improved by taking two or sensor measurements at a particular edge of the first foot 714. For instance, in a second example implementation, the foot 710 may be tipped so that the first edge 716A contacts the surface 702 and the force sensor 714 may take a first measurement, and the foot 710 may be tipped so that the first edge 716A contacts the surface 702 a second time and the force sensor 714 may take a second measurement. As part of the first measurement, the force sensor 714 may generate first force data and first moment data, and as part of the second measurement, the force sensor 714 may generate second force data and second moment data. In such an example implementation, the pseudoinverse of the first matrix A and the second matrix b may take the form as shown in equation [13]:

$$A = {}^t\begin{bmatrix} a_1 & a_2 \\ -a_1\hat{P}_1 & -a_2\hat{P}_2 \end{bmatrix} \quad b = \begin{bmatrix} -a_1(M_1^* - \hat{P}_1 F_1^*) \\ -a_2(M_2^* - \hat{P}_1 F_2^*) \end{bmatrix} \quad [13]$$

In equation [13], the notation "1" may refer to the first measurement at the first edge 716A, and "2" may refer to the second measurement at the first edge 716A. Accordingly, in some implementations, $a_1$ may be equal to $a_2$, and $\hat{P}_i$ may be equal to $\hat{P}_2$. However, in other implementations, $a_1$ might not be equal to $a_2$, and $\hat{P}_i$ might not be equal to $\hat{P}_2$.

In equation [13], the pseudoinverse of the first matrix may be a two by two matrix (2×2). In addition, in equation [13], the second matrix may be a two by one matrix (2×1). Accordingly, the force offset and the moment offset may be determined by matrix multiplication of the pseudoinverse of the first matrix and the second matrix as shown in equation [14]:

$$\begin{bmatrix} Mo \\ Fo \end{bmatrix} = A^+ b, \text{ where } A \text{ and } b \text{ are defined by equation [13]}. \quad [14]$$

As shown in equation [14], determining the force offset and the moment offset may involve a combination of the first force data, first moment data, second force data, and second moment data.

Although the second example implementation described above involved tipping the foot 710 so that the first edge 716A contacts the surface 702 two times, in other implementations the foot 710 may be tipped so that the first edge 716A contacts the surface 702 three or more times. In such implementations, the force offset and moment offset may be determined in a similar manner as in the second example implementation.

Moreover, although the second example implementation described above involved tipping the foot 710 so that the first edge 716A contacts the surface 702 two times, in other implementations the foot 710 may be tipped so that the second edge 716B, the third edge 716C, or the fourth edge 716D contacts the surface 702 one or more times. In such implementations, the force offset and moment offset may be determined in a similar manner as in the second example implementation.

C. Third Example Implementation: One Measurement at Each of Two Edges

In some implementations, an accuracy of the calibration of the force sensor 714 may be improved by taking at least one sensor measurement at two or more edges of the foot 710. For instance, in an example implementation, the foot 710 may be tipped so that the first edge 716A contacts the surface 702 and the force sensor may take a first measurement, and the foot 710 may be tipped so that the second edge 716B contacts the surface 702 a second time and the force sensor 714 may take a second measurement. As part of the first measurement, the first measurement, the force sensor 714 may generate first force data and first moment data, and as part of the second measurement, the force sensor 714 may generate second force data and second moment data. In addition, when the first edge 716A contacts the surface 702, a first ZMP may be located on the first edge 716A and there is a first distance between the first ZMP and the measurement location 760. Moreover, when the second edge 716B contacts the surface 702, a second ZMP may be located on the second edge 716B and there is a second distance between the second ZMP and the measurement location 760. In such an example implementation, the first matrix A and the second matrix b may take the form as shown in equation [16]:

$$A = {}^t\begin{bmatrix} a_1 & a_2 \\ -a_1\hat{P}_1 & -a_2\hat{P}_2 \end{bmatrix} \quad b = \begin{bmatrix} -a_1(M_1^* - \hat{P}_1 F_1^*) \\ -a_2(M_2^* - \hat{P}_2 F_2^*) \end{bmatrix} \quad [16]$$

In equation [16], the notation "1" may refer to the measurement at the first edge 716a, and "2" may refer to the measurement at the second edge 716A. Accordingly, $a_1$ is an axis on the first edge 716A, $a_2$ is an axis on the second edge 716B, $\hat{P}_i$ is a position vector based on the first distance between the first ZMP and the measurement location 760, and $\hat{P}_2$ is a position vector based on the second distance between the second ZMP and the measurement location 760.

In equation [16], the pseudoinverse of the first matrix may be two by two matrix (2×2). In addition, in equation [16], the second matrix may be a two by one matrix (2×1). Accordingly, the force offset and the moment offset may be determined by matrix multiplication of the pseudoinverse of the first matrix and the second matrix as shown in equation [17]:

$$\begin{bmatrix} Mo \\ Fo \end{bmatrix} = A^+ b, \text{ where } A \text{ and } b \text{ are defined by equation [16].} \quad [17]$$

As shown in equation [17], determining the force offset and the moment offset may involve an averaging of the first force data, first moment data, second force data, and second moment data.

Although the third example implementation described above involved tipping the foot 710 so that the first edge 716A contacts the surface 702 and then tipping the foot 710 so that the second edge 716b contacts the surface 702, in other implementations the foot 710 may be tipped so that any particular edge of the sole 712 may contact the surface 702 and then the foot 710 may be tipped so that another edge of the sole 712 may contact the surface 702. In such implementations, the force offset and moment offset may be determined in a similar manner as in the third example implementation.

Further, some example implementations may involve tipping the foot 710 so that a particular edge contacts the surface 702 two or more times and tipping the foot 710 so that another edge contacts the surface one or more times. In such implementations, the force offset and moment offset may be determined in a similar manner as a combination of the second example implementation and third example implementation.

Although the example implementations described above with respect to FIG. 7 involved a foot with a sole having four edges, other implementations may involve a foot with a sole having more or less than four edges, such as three edges, five edges, six edges, etc. In such implementations, the force offset and moment offset may be determined in a similar manner as the example implementations described above with respect to FIG. 7. For example, when a foot includes a sole having N edges, the foot may be tipped so that a particular edge may contact the surface 702, and the other N−1 edges might not contact the surface 702.

IV. EXAMPLE METHODS

Figure 8:
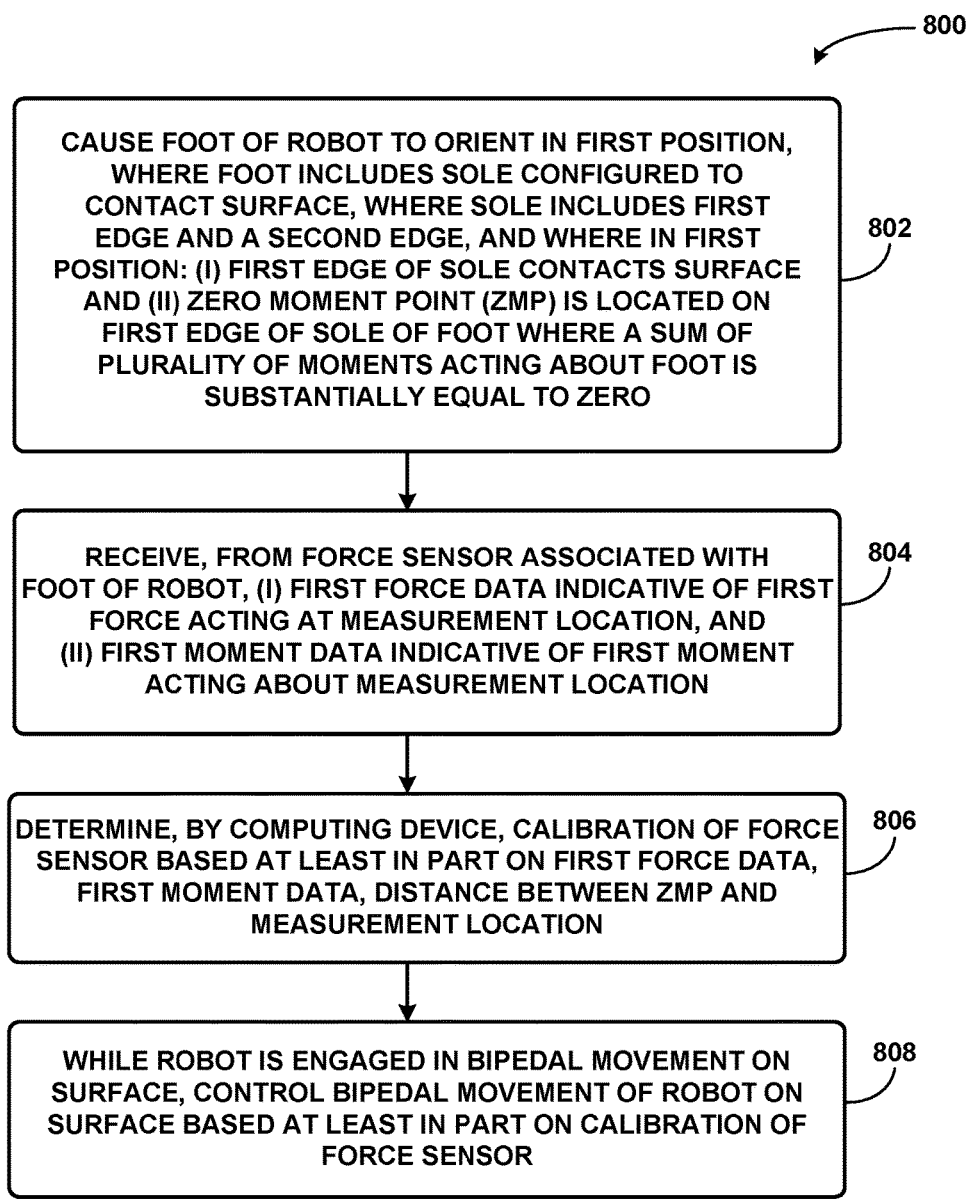
FIG. 8 is a flowchart, according to an example implementation.

FIG. 8 is a flow chart illustrating a method 800 according to an example implementation. The method 800 may include one or more operations, functions, or actions as illustrated by one or more blocks 802-808. Although the blocks are illustrated in sequential order, the blocks may in some instances be performed in parallel. Also, various blocks may be combined into fewer blocks, divided into additional blocks, and/or removed based upon the desired implementation.

Illustrative methods, such as method 800, may be carried out in whole or in part by a component or components of a robot. For simplicity, method 800 may be described generally as being carried out by a robot, such as the robot 400. However, it should be understood that example methods, such as the method 800, may be carried out by other entities or combination of entities without departing from the scope of this disclosure.

At block 802, the method 800 may involve causing a foot of a robot to orient in a first position, where the foot includes a sole configured to contact a surface, where the sole includes a first edge and a second edge, and where in the first position: (i) the first edge of the sole contacts the surface, and (ii) a zero moment point (ZMP) is located on the first edge of the sole of the foot where a sum of a plurality of moments acting about the first edge is substantially equal to zero.

In some implementations, the robot may take the form of or be similar in form to the robot 400, the surface may take the form of or be similar in form to the surface 402, and the foot may take the form of or be similar in form to the first foot 410 and/or the second foot 420. Moreover, in some implementations, block 802 may be performed in the same or similar manner as the first phase described above with respect to example 500 and/or example 600.

Further, in some implementations, the robot may be configured to travel on the surface in a travel direction, and the first edge is substantially parallel to the travel direction. Yet further, in some implementations, the robot may be configured to travel on the surface in a travel direction, and the first edge may be substantially perpendicular to the travel direction. Moreover, in some implementations, the travel direction may take the form of or be similar in form to the travel direction 404.

Moreover, in some implementations, the first edge may be a posterior edge. Further, in some implementations, the first edge may be an anterior edge.

At block 804, the method 800 may involve receiving, from a force sensor associated with the foot of the robot, (i) first force data indicative of a first force acting at a measurement location on the robot and (ii) first moment data indicative of a first moment acting about the measurement location.

In some implementations, the force sensor may take the form of the force sensor 414 and/or the force sensor 424. Moreover, in some implementations, block 804 may be performed in the same or similar manner as the second phase described above with respect to example 500 and/or example 600.

At block 806, the method 800 may involve determining, by a computing device, a calibration of the force sensor based at least in part on the first force data, the first moment data, and a distance between the ZMP and the measurement location.

In some implementations, the measurement location may take the form of the measurement location 430 and/or the measurement location 440, and the distance may take the form of the distance 464 and/or the distance 474. Moreover, in some implementations, block 806 may be performed in the same or similar manner as the third phase described above with respect to example 500 and/or example 600.

Moreover, in some implementations, the calibration of the force sensor includes a force offset and a moment offset. Determining the calibration of the force sensor based at least in part on the first force data, the first moment data, and the distance between the ZMP and the measurement location may involve determining, by the computing device, a first matrix based on the distance between the ZMP and the measurement location, determining, by the computing device, a second matrix based on a difference between (i) the first moment data and (ii) the distance between the ZMP and the measurement location multiplied by the first force data, and determining, by the computing device, the force offset and moment offset based on matrix multiplication of (i) a psuedoinverse of the first matrix and (ii) the second matrix.

In some such implementations, determining the first matrix, determining the second matrix, and determining the force offset and moment offset may be performed in the same or similar way the as first matrix, second matrix, and force offset and moment offset are determined in the first example implementation as described above with respect to FIG. 7.

In some implementations, method 800 may further involve causing the foot of the robot to orient in the first position a second time, where in the first position the second time: (i) the first edge of the sole contacts the surface, and (ii) the ZMP is located on the first edge of the sole of the foot where the sum of the first plurality of moments acting about the first edge is substantially equal to zero, and receiving, from the force sensor, (i) second force data indicative of a second force acting at the measurement location and (ii) second moment data indicative of a second moment acting about the measurement location. Determining the calibration of the force sensor involves determining the calibration of the force sensor based at least in part on the first force data, the first moment data, the second force data, the second moment data, and the distance between the ZMP and the measurement location.

Moreover, in some implementations, the calibration of the force sensor may include a force offset and a moment offset. Determining the calibration of the force sensor based at least in part on the first force data, the first moment data, second force data, the second moment data, and the distance between the ZMP and the measurement location may involve determining, by the computing device, a first matrix based on the distance between the ZMP and the measurement location, determining, by the computing device, a second matrix based on (i) a difference between (a) the first moment data and (b) the distance between the ZMP and the measurement location multiplied by the first force data and (ii) a difference between (a) the second moment data and (b) the distance between the ZMP and the measurement location multiplied by the second force data, and determining, by the computing device, the force offset and moment offset based on matrix multiplication of (i) a pseudoinverse of the first matrix and (ii) the second matrix. In some such implementations, determining the first matrix, determining the second matrix, and determining the force offset and moment offset may be performed in the same or similar way the as first matrix, second matrix, and force offset and moment offset are determined in the second example implementation as described above with respect to FIG. 7.

Further, in some implementations, the method 800 may further involve causing the foot of a robot to orient in a second position, where in the second position: (i) the second edge of the sole contacts the surface, and (ii) a second ZMP is located on the second edge of the sole of the foot where a sum of a second plurality of moments acting on the foot is substantially equal to zero, and receiving, from the force sensor, (i) second force data indicative of a second force acting on the foot at the measurement location and (ii) second moment data indicative of a second moment acting at the measurement location. Determining the calibration of the force sensor involves determining the calibration of the force sensor based at least in part on the first force data, the first moment data, the second force data, the second moment data, the distance between the ZMP and the measurement location, and a second distance between the second ZMP and the measurement location.

Moreover, in some implementations, the calibration of the force sensor may include a force offset and a moment offset. Determining the calibration of the force sensor based at least in part on the first force data, the first moment data, second force data, the second moment data, the distance between the ZMP and the measurement location, and the second distance between the second ZMP and the measurement location may involve determining, by the computing device, a first matrix based on (i) the distance between the ZMP and the measurement location on the robot and (ii) the second distance between the second ZMP and measurement location, determining, by the computing device, a second matrix based on (i) a difference between (a) the first moment data and (b) the distance between the ZMP and the measurement location multiplied by the first force data and (ii) a difference between (a) the second moment data and (b) the second distance between the ZMP and the measurement location multiplied by the second force data, and determining, by the computing device, the force offset and moment offset based on matrix multiplication of (i) a pseudoinverse of the first matrix and (ii) the second matrix. In some such implementations, determining the first matrix, determining the second matrix, and determining the force offset and moment offset may be performed in the same or similar way the as first matrix, second matrix, and force offset and moment offset are determined in the third example implementation as described above with respect to FIG. 7.

At block 808, the method 800 may involve while the robot is engaged in bipedal movement, controlling the bipedal movement of the robot on the surface based at least in part on the calibration of the force sensor.

In some implementations, the method 800 may further involve determining, by the computing device, to calibrate the force sensor, and in response to the determining to calibrate the force sensor, causing the foot to orient in the first position. In some implementations, determining to calibrate the force sensor may involve determining, by the computing device, that the robot is engaged in bipedal movement, and in response to determining that the robot is engaged in bipedal movement, causing the robot to stop the bipedal movement.

Moreover, in some implementations, determining to calibrate the force sensor may involve determining to calibrate the force sensor based at least in part on receiving an indication that the robot has engaged in bipedal movement for a predetermined amount of time. Further, in some implementations, determining to calibrate the force sensor may involve determining to calibrate the force sensor based at least in part on receiving an indication that the robot has engaged in bipedal movement for a predetermined distance.

V. CONCLUSION

While various implementations and aspects have been disclosed herein, other aspects and implementations will be apparent to those skilled in the art. The various implementations and aspects disclosed herein are for purposes of illustration and are not intended to be limiting, with the scope being indicated by the following claims.

We claim:
1. A method comprising:
   causing a foot of a robot to orient in a first position, wherein the foot comprises a sole configured to contact a surface, wherein the sole comprises a first edge and a second edge, and wherein in the first position:
   (i) the first edge contacts the surface and the second edge does not contact the surface, and
   (ii) a zero moment point (ZMP) is located on the first edge where a sum of a plurality of moments acting about the first edge is substantially equal to zero;

receiving, from a force sensor associated with the foot of the robot, (i) first force data indicative of a first force acting at a measurement location on the robot and (ii) first moment data indicative of a first moment acting about the measurement location;

determining, by a computing device, a calibration of the force sensor based at least in part on the first force data, the first moment data, and a distance between the ZMP and the measurement location; and while the robot is engaged in bipedal movement, controlling the bipedal movement of the robot on the surface based at least in part on the calibration of the force sensor.

2. The method of claim 1, wherein the calibration of the force sensor comprises a force offset and a moment offset, and wherein determining the calibration of the force sensor based at least in part on the first force data, the first moment data, and the distance between the ZMP and the measurement location comprises:

determining, by the computing device, a first matrix based on the distance between the ZMP and the measurement location;

determining, by the computing device, a second matrix based on a difference between (i) the first moment data and (ii) the distance between the ZMP and the measurement location multiplied by the first force data; and determining, by the computing device, the force offset and moment offset based on matrix multiplication of (i) a pseudoinverse of the first matrix and (ii) the second matrix.

3. The method of claim 1, wherein the robot is configured to travel on the surface in a travel direction, and wherein the first edge is substantially parallel to the travel direction.

4. The method of claim 1, wherein the first edge is a posterior edge.

5. The method of claim 1, wherein the first edge is an anterior edge.

6. The method of claim 1, wherein the robot is configured to walk on the surface in a travel direction, and wherein the first edge is substantially perpendicular to the travel direction.

7. The method of claim 1 further comprising:

causing the foot of the robot to orient in the first position a second time, wherein in the first position the second time:
(i) the first edge contacts the surface and the second edge does not contact the surface, and
(ii) the ZMP is located on the first edge where the sum of the first plurality of moments acting about the first edge is substantially equal to zero; and receiving, from the force sensor, (i) second force data indicative of a second force acting at the measurement location and (ii) second moment data indicative of a second moment acting about the measurement location, wherein determining the calibration of the force sensor comprises determining the calibration of the force sensor based at least in part on the first force data, the first moment data, the second force data, the second moment data, and the distance between the ZMP and the measurement location.

8. The method of claim 7, wherein the calibration of the force sensor comprises a force offset and a moment offset, and wherein determining the calibration of the force sensor based at least in part on the first force data, the first moment data, second force data, the second moment data, and the distance between the ZMP and the measurement location comprises:

determining, by the computing device, a first matrix based on the distance between the ZMP and the measurement location;

determining, by the computing device, a second matrix based on (i) a difference between (a) the first moment data and (b) the distance between the ZMP and the measurement location multiplied by the first force data and (ii) a difference between (a) the second moment data and (b) the distance between the ZMP and the measurement location multiplied by the second force data; and determining, by the computing device, the force offset and moment offset based on matrix multiplication of (i) a pseudoinverse of the first matrix and (ii) the second matrix.

9. The method of claim 1 further comprising:

causing the foot of the robot to orient in a second position, wherein in the second position:
(i) the second edge contacts the surface and the first edge does not contact the surface, and
(ii) a second ZMP is located on the second edge where a sum of a second plurality of moments acting about the second edge is substantially equal to zero; and receiving, from the force sensor, (i) second force data indicative of a second force acting at the measurement location and (ii) second moment data indicative of a second moment acting about the measurement location, wherein determining the calibration of the force sensor comprises determining the calibration of the force sensor based at least in part on the first force data, the first moment data, the second force data, the second moment data, the distance between the ZMP and the measurement location, and a second distance between the second ZMP and the measurement location.

10. The method of claim 9, wherein the calibration of the force sensor comprises a force offset and a moment offset, and wherein determining the calibration of the force sensor based at least in part on the first force data, the first moment data, second force data, the second moment data, the distance between the ZMP and the measurement location, and the second distance between the second ZMP and the measurement location comprises:

determining, by the computing device, a first matrix based on (i) the distance between the ZMP and the measurement location and (ii) the second distance between the second ZMP and the measurement location;

determining, by the computing device, a second matrix based on (i) a difference between (a) the first moment data and (b) the distance between the ZMP and the measurement location multiplied by the first force data and (ii) a difference between (a) the second moment data and (b) the second distance between the ZMP and the measurement location multiplied by the second force data; and determining, by the computing device, the force offset and moment offset based on matrix multiplication of (i) a pseudoinverse of the first matrix and (ii) the second matrix.

11. The method of claim 1 further comprising:

determining, by the computing device, to calibrate the force sensor; and in response to determining to calibrate the force sensor, causing the foot to orient in the first position.

12. The method of claim 11, wherein determining to calibrate the force sensor comprises:

determining, by the computing device, that the robot is engaged in bipedal movement; and in response to determining that the robot is engaged in bipedal movement, causing the robot to stop the bipedal movement.

13. The method of claim 11, wherein determining to calibrate the force sensor comprises determining to calibrate the force sensor based at least in part on receiving an indication that the robot has engaged in bipedal movement for a predetermined amount of time.

14. The method of claim 11, wherein determining to calibrate the force sensor comprises determining to calibrate the force sensor based at least in part on receiving an indication that the robot has engaged in bipedal movement for a predetermined distance.

15. A robot comprising:
a foot, wherein the foot comprises a sole configured to contact a surface, wherein the sole comprises a first edge and a second edge;
a force sensor associated with the foot;
a processor;
a non-transitory computer readable medium; and
program instructions stored on the non-transitory computer readable medium that, when executed by the processor, cause the robot to perform operations comprising:
  causing the foot to orient in a first position, wherein in the first position:
    (i) the first edge contacts the surface and the second edge does not contact the surface, and
    (ii) a zero moment point (ZMP) is located on the first edge where a sum of a plurality of moments acting about the first edge is substantially equal to zero;
  receiving, from the force sensor, (i) first force data indicative of a first force acting at a measurement location on the robot and (ii) first moment data indicative of a first moment acting about the measurement location;
  determining a calibration of the force sensor based at least in part on the first force data, the first moment data, and a distance between the ZMP and the measurement location; and
  while the robot is engaged in bipedal movement, controlling the bipedal movement of the robot on the surface based at least in part on the calibration of the force sensor.

16. The robot of claim 15, wherein the calibration of the force sensor comprises a force offset and a moment offset, and wherein determining the calibration of the force sensor based at least in part on the first force data, the first moment data, and the distance between the ZMP and the measurement location comprises:
  determining a first matrix based on the distance between the ZMP and the measurement location;
  determining a second matrix based on a difference between (i) the first moment data and (ii) the distance between the ZMP and the measurement location multiplied by the first moment data; and
  determining the force offset and moment offset based on matrix multiplication of (i) a psuedoinverse of the first matrix and (ii) the second matrix.

17. The robot of claim 15, wherein the operations further comprise:
  determining to calibrate the force sensor; and
  in response to determining to calibrate the force sensor, causing the foot to orient in the first position.

18. A non-transitory computer readable medium having stored therein program instructions executable by a computing device to cause the computing device to perform operations, the operations comprising:
  causing a foot of a robot to orient in a first position, wherein the foot comprises a sole configured to contact a surface, wherein the sole comprises a first edge and a second edge, and wherein in the first position:
    (i) the first edge contacts the surface and the second edge does not contact the surface, and
    (ii) a zero moment point (ZMP) is located on the first edge where a sum of a plurality of moments acting about the first edge is substantially equal to zero;
  receiving, from a force sensor associated with the foot of the robot, (i) first force data indicative of a first force acting at a measurement location on the robot and (ii) first moment data indicative of a first moment acting about the measurement location;
  determining a calibration of the force sensor based at least in part on the first force data, the first moment data, and a distance between the ZMP and the measurement location; and
  while the robot is engaged in bipedal movement, controlling the bipedal movement of the robot on the surface based at least in part on the calibration of the force sensor.

19. The non-transitory computer readable medium of claim 18, wherein the calibration of the force sensor comprises a force offset and a moment offset, and wherein determining the calibration of the force sensor based at least in part on the first force data, the first moment data, and the distance between the ZMP and the measurement location comprises:
  determining a first matrix based on the distance between the ZMP and the measurement location;
  determining a second matrix based on a difference between (i) the first moment data and (ii) the distance between the ZMP and the measurement location multiplied by the first moment data; and
  determining the force offset and moment offset based on matrix multiplication of (i) a psuedoinverse of the first matrix and (ii) the second matrix.

20. The non-transitory computer readable medium of claim 18, wherein the first edge is a posterior edge or an anterior edge.

* * * * *